United States Patent
Ikizyan et al.

(10) Patent No.: US 11,436,445 B2
(45) Date of Patent: Sep. 6, 2022

(54) METHODS AND APPARATUS FOR ADAPTIVE OBJECT CLASSIFICATION

(71) Applicant: QUALCOMM Incorporated, San Diego, CA (US)

(72) Inventors: Ike Ikizyan, San Diego, CA (US); Min Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 16/841,518

(22) Filed: Apr. 6, 2020

(65) Prior Publication Data
US 2021/0312245 A1     Oct. 7, 2021

(51) Int. Cl.
*G06K 9/62* (2022.01)
*G06V 10/50* (2022.01)
*G06V 10/56* (2022.01)
*G06V 10/88* (2022.01)

(52) U.S. Cl.
CPC .......... *G06K 9/6267* (2013.01); *G06V 10/50* (2022.01); *G06V 10/56* (2022.01); *G06V 10/88* (2022.01)

(58) Field of Classification Search
CPC ............ G06K 9/00664; G06K 9/6253; G06K 9/6256; G06K 9/66; G06K 9/00335; G06K 9/3233; G06K 9/4628; G06K 9/6274; G06K 9/6267; G06K 9/6273; G06K 9/6268; G06K 9/627; G06N 3/08; G06N 20/00; G06N 5/14; G06N 5/048; G06N 3/045; H04L 29/06; H04L 63/1425; G06T 7/0069; G06T 7/751; G06T 7/579; G06T 7/50; G06T 5/005; G06T 5/50; G06T 7/20; G06T 7/74; G06T 7/246; G06T 7/277; G06T 7/75; G06T 7/251; G06T 7/248; H04N 13/117; H04N 19/553; H04N 13/00; H04N 19/00; G06V 10/50; G06V 10/56; G06V 10/88; G06V 10/764; G06V 30/19173
See application file for complete search history.

(56) References Cited

U.S. PATENT DOCUMENTS

| | | | |
|---|---|---|---|
| 9,129,189 B2 * | 9/2015 | Hamsici | G06V 10/50 |
| 2006/0170769 A1 * | 8/2006 | Zhou | G06V 20/52 |
| | | | 382/103 |
| 2007/0258646 A1 * | 11/2007 | Sung | G06V 40/167 |
| | | | 382/191 |

* cited by examiner

*Primary Examiner* — Duy M Dang
(74) *Attorney, Agent, or Firm* — Campbell C. Chiang; Procopio, Cory, Hargreaves & Savitch LLP

(57) ABSTRACT

The present disclosure relates to methods and apparatus for image processing. The apparatus can generate object mask information for one or more objects in a first image of a plurality of images in a scene. In some aspects, the first image can be at least one of a downscaled image, a downsampled image, or a low resolution image. The apparatus can also determine one or more object classifications of the first image based on the generated object mask information. Additionally, the apparatus can identify a modification to at least one of the one or more object classifications based on a second image of the plurality of images in the scene. In some aspects, the apparatus can adjust or maintain the one or more object classifications based on the identified modification to at least one of the one or more object classifications.

30 Claims, 7 Drawing Sheets

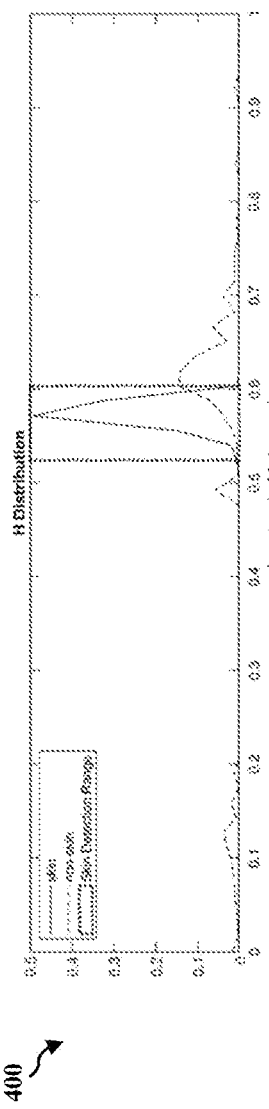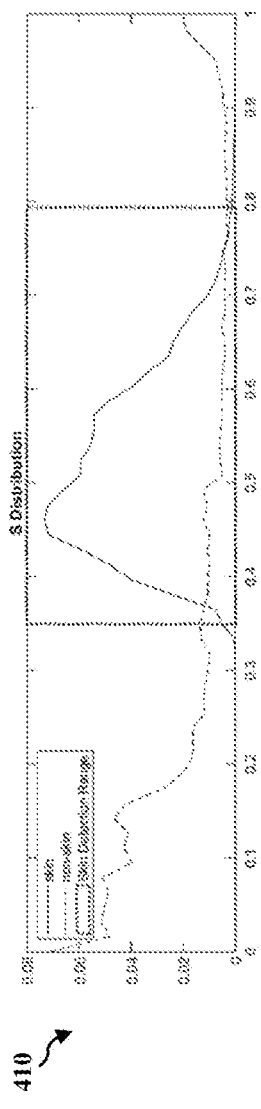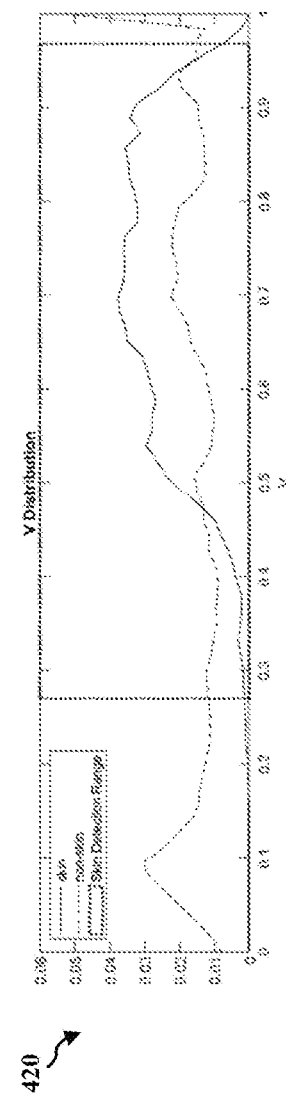
FIG. 4A
FIG. 4B
FIG. 4C

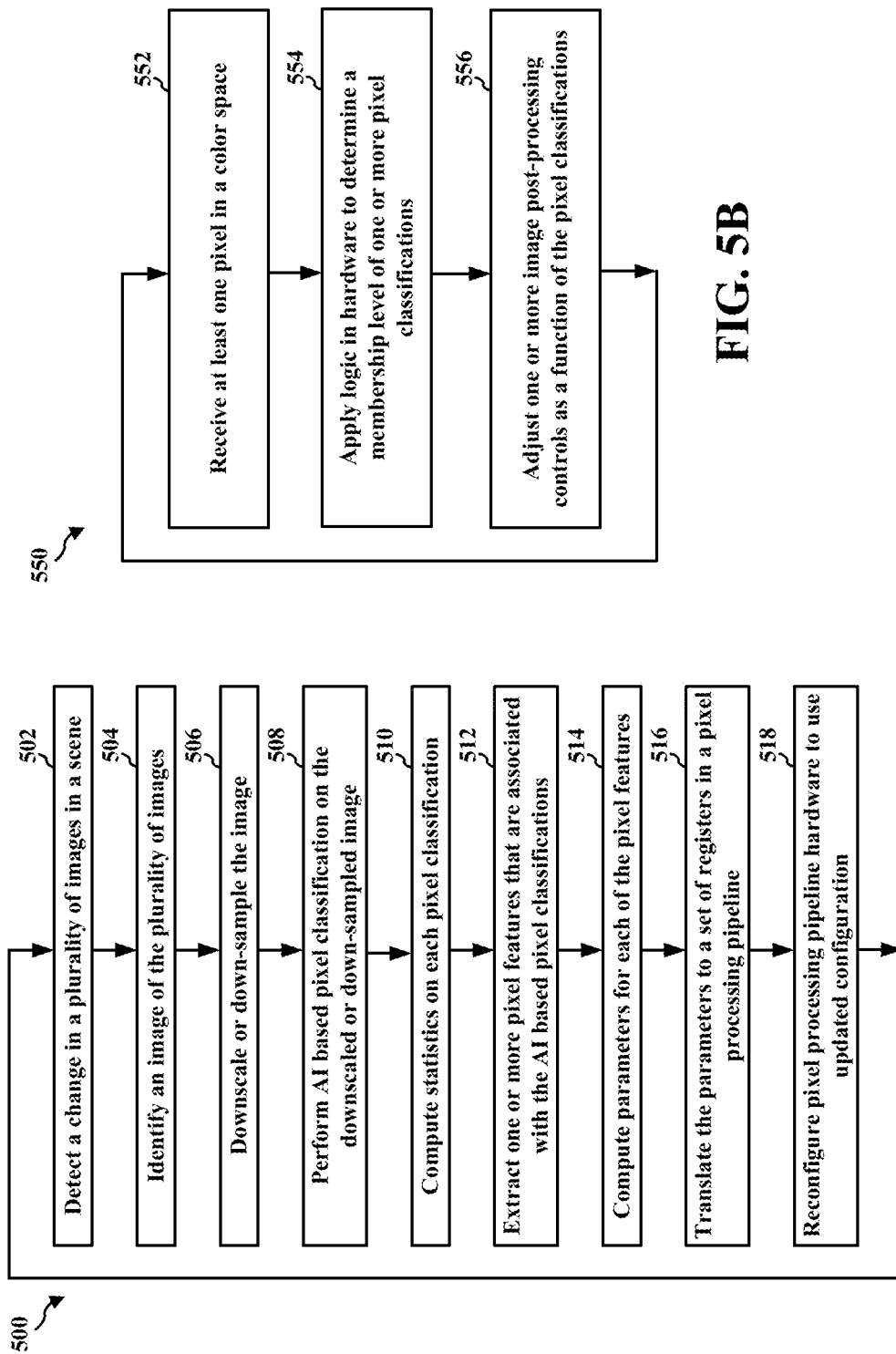

METHODS AND APPARATUS FOR ADAPTIVE OBJECT CLASSIFICATION

TECHNICAL FIELD

The present disclosure relates generally to processing systems and, more particularly, to one or more techniques for image or video processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

An electronic device may execute a program to present image or video content on a display. For example, an electronic device may execute an image application, a video application, and the like.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an image processing unit, a video processing unit, a display processing unit (DPU), a display engine, a GPU, a CPU, or some other processor for image or video processing. In some aspects, the apparatus can downscale or down-sample a first image of a plurality of images in a scene. The apparatus can also generate object mask information for one or more objects in a first image of a plurality of images in a scene, where the first image can be at least one of a downscaled image, a down-sampled image, or a low resolution image. The apparatus can also determine one or more object classifications of the first image based on the generated object mask information. Additionally, the apparatus can map the one or more object classifications of the first image to a histogram, where the one or more object classifications may include one or more trapezoidal regions. The apparatus can also identify at least one of a first object classification or one or more second object classifications of the first image based on the determined one or more object classifications. The apparatus can also modify at least one of the first object classification or the one or more second object classifications of the first image. Further, the apparatus can identify a modification to at least one of the one or more object classifications based on a second image of the plurality of images in the scene. The apparatus can also adjust or maintain the one or more object classifications based on the identified modification to at least one of the one or more object classifications. The apparatus can also adjust or maintain the object mask information based on the identified modification to at least one of the one or more object classifications. Moreover, the apparatus can configure an object detector or a color detector based on the identified modification to at least one of the one or more object classifications.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A, 4B, and 4C illustrate example hue (H), saturation (S), and value (V) (HSV) distribution graphs in accordance with one or more techniques of this disclosure.

FIGS. 5A and 5B illustrate example object classification processes in accordance with one or more techniques of this disclosure.

DETAILED DESCRIPTION

Figure 1:
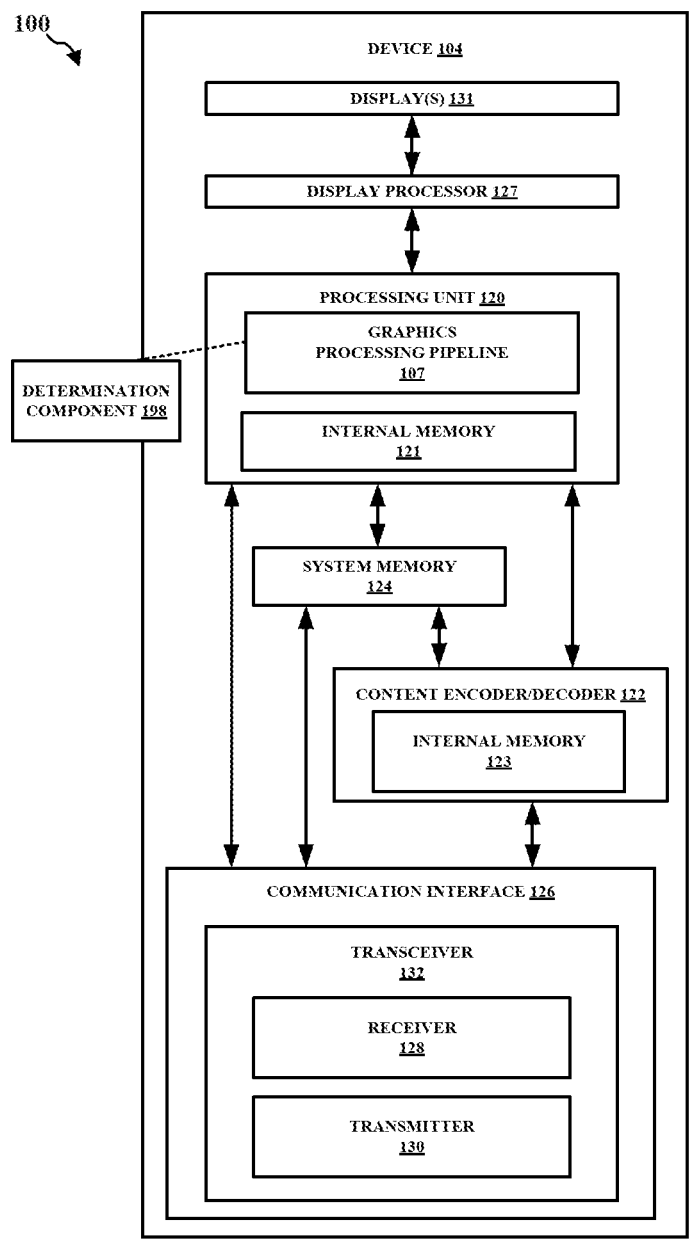
FIG. 1 is a block diagram that illustrates an example content generation system in accordance with one or more techniques of this disclosure.

Utilizing a static definition of objects or colors can make it difficult to identify objects or colors in an image. For instance, static object or color tone identification systems can be too narrowly defined, such that some desired objects or color tones in an image may not be identified. Also, static object or color tone identification systems can be too broadly defined, such that color tones outside a desirable color tone in an image may be identified as desirable color tones. Indeed, as certain colors or objects can differ in tone, a static object or color tone identification system may not consistently function accurately. Further, object or color identification systems can utilize too much power, such that power is wasted at a device. Aspects of the present disclosure can utilize adaptive object or color identification systems, as well as adaptive memory color tuning. By doing so, aspects of the present disclosure can consistently and accurately identify certain types of objects or colors. Aspects of the present disclosure can also include object or color identification systems that can reduce the amount of power utilized. For example, aspects of the present disclosure can reduce the amount of power consumed by display devices.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to determine display content and/or generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to downscale or down-sample a first image of a plurality of images in a scene. The determination component 198 can also be configured to generate object mask information for one or more objects in a first image of a plurality of images in a scene, where the first image can be at least one of a downscaled image, a down-sampled image, or a low resolution image. The determination component 198 can also be configured to determine one or more object classifications of the first image based on the generated object mask information. The determination component 198 can also be configured to map the one or more object classifications of the first image to a histogram, where the one or more object classifications may include one or more trapezoidal regions. The determination component 198 can also be configured to identify at least one of a first object classification or one or more second object classifications of the first image based on the determined one or more object classifications. The determination component 198 can also be configured to modify at least one of the first object classification or the one or more second object classifications of the first image. The determination component 198 can also be configured to identify a modification to at least one of the one or more object classifications based on a second image of the plurality of images in the scene. The determination component 198 can also be configured to adjust or maintain the one or more object classifications based on the identified modification to at least one of the one or more object classifications. The determination component 198 can also be configured to adjust or maintain the object mask information based on the identified modification to at least one of the one or more object classifications. The determination component 198 can also be configured to configure an object detector or a color detector based on the identified modification to at least one of the one or more object classifications.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline.

Figure 2:
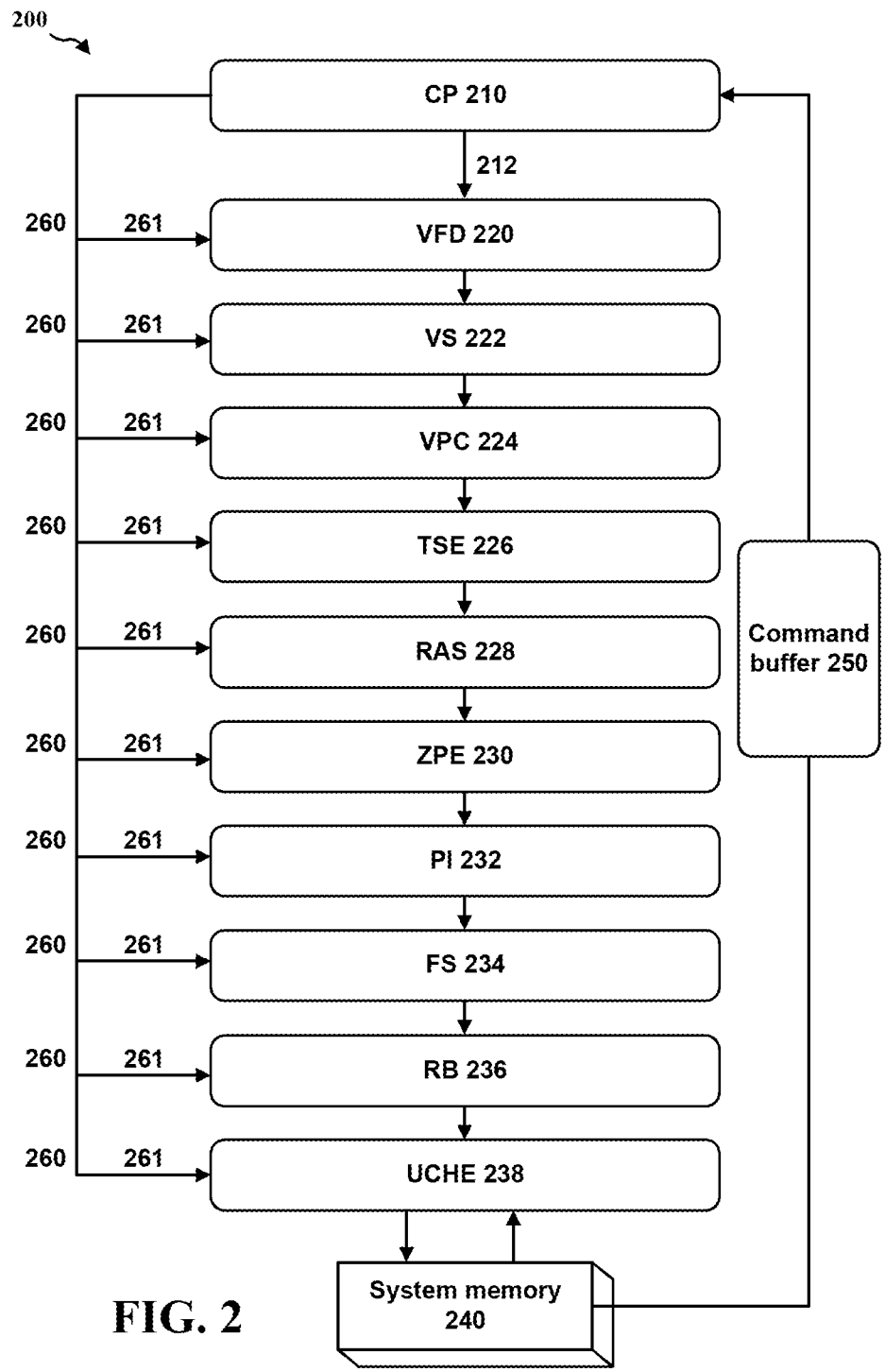
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call data packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call data packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured as follows: context register of context N, draw call(s) of context N, context register of context N+1, and draw call(s) of context N+1.

In some aspects of image or video processing, a number of different objects or colors can be adjusted or enhanced in an image or frame. By doing so, the objects or colors in an image can be improved, which can improve the overall appearance of the image. In order to adjust or enhance the objects or colors in an image, the objects or colors may need to be identified prior to the adjustment or enhancement. In some instances, this process can be performed in an image processing pipeline or a display processing pipeline. Moreover, this process can be referred to as an object or color identification process.

Some aspects of object or color identification can use differently shaped regions, e.g., trapezoidal regions, to detect different objects or colors. For instance, different color spaces, e.g., hue, saturation, value (HSV) color spaces, red, green, blue (RGB) color spaces, or luminance, chrominance (YUV) color spaces, can use different axes during histogram mapping to detect certain objects or colors. In some aspects, the objects or colors can include a memory color, e.g., skin, sky, or foliage, in the image during the object or color identification process.

Additionally, some color regions can vary with different content and/or lighting conditions. As such, it can be difficult to determine or identify a memory color region definition that applies to all color contents. For example, memory color tone detectors may be too narrowly defined, such that they omit certain variations in skin, sky, or foliage tones. Memory color tone detectors may also be too broadly defined, such that they detect or identify near-skin color tones, e.g., sandy beaches or beige colored walls. Moreover, color or skin tone distributions in a given color space may vary between different individuals and/or lighting conditions. Accordingly, it can be difficult to identify the skin tone in an image, as skin tones may vary from person to person.

As indicated above, utilizing a static definition of objects or colors can make it difficult to identify objects or colors in an image. For instance, static object or color tone identification systems can be too narrowly defined, such that some desired objects or color tones in an image may not be identified. Based on this, certain types of skin tones in an image may not be identified with static color detection systems. Also, static object or color tone identification systems can be too broadly defined, such that color tones outside a desirable color in an image may be identified as the desirable color tones. Indeed, as certain colors or objects can differ in tone, a static object or color tone identification system may not consistently function accurately. Accordingly, there is a present need for adaptive object or color identification systems, as well as adaptive memory color tuning. Further, object or color identification systems can utilize too much power, such that power is wasted at a display device.

Aspects of the present disclosure can utilize adaptive object or color identification systems, as well as adaptive memory color tuning. By doing so, aspects of the present disclosure can consistently and accurately identify certain types of objects or colors, e.g., when the tones of the objects or colors may be inconsistent. Aspects of the present disclosure can also include object or color identification systems that can reduce the amount of power utilized. For example, aspects of the present disclosure can reduce the amount of power consumed by display devices.

Aspects of the present disclosure can also use artificial intelligence (AI) processes or methods to generate an adaptive object or color identification system. For instance, the present disclosure can generate a memory color mask, e.g., a skin, sky, or foliage color mask, on a low resolution image. Also, memory color masks may not need to be generated on every image or frame. By doing so, aspects of the present disclosure can reduce the amount of power consumed. In some aspects, the present disclosure can utilize AI technology on an image or frame, such that the AI can determine certain objects or colors in the image or frame. Also, image processing hardware can be reconfigured to create a custom or adaptive object or color identification system for similar images or frames.

In some instances, aspects of the present disclosure can downscale or down-sample an image or frame to provide a low resolution image or frame. By downscaling or down-sampling the image, the present disclosure can reduce the amount of pixels in the image and maintain a low power consumption when processing the image. As indicated herein, aspects of the present disclosure can also create or generate a color or object detection mask, e.g., a skin detection mask or memory color mask.

Figure 3:
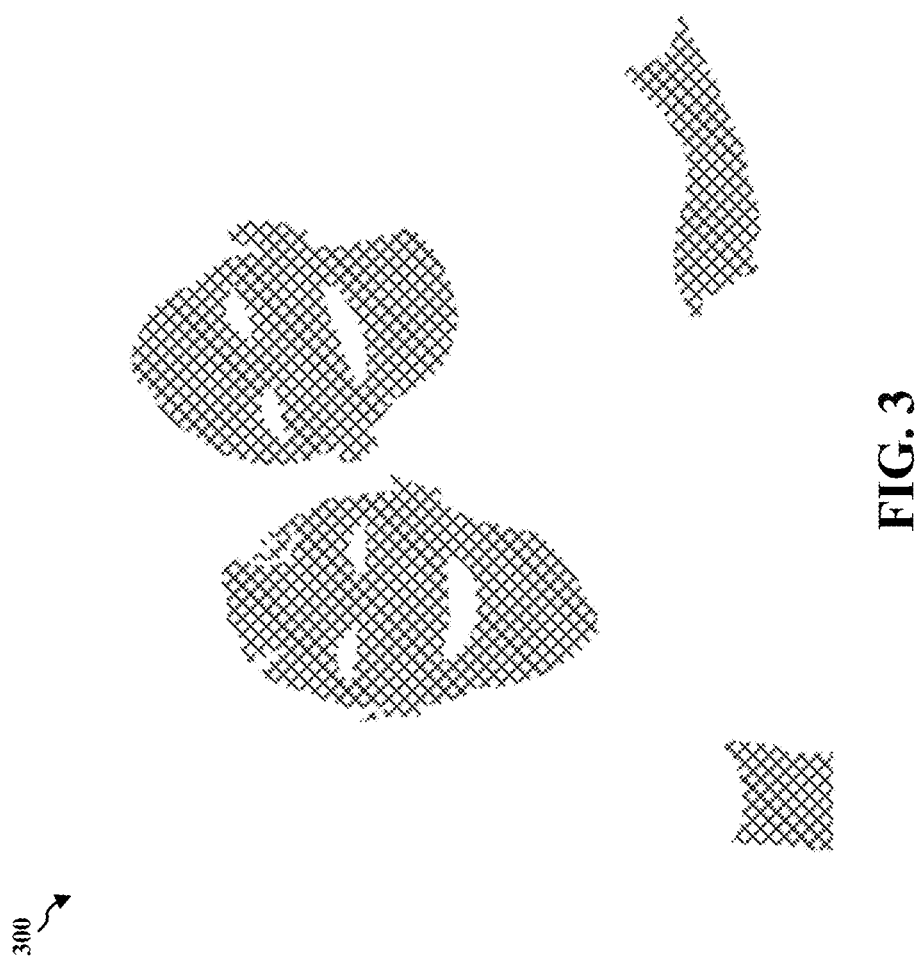
FIG. 3 illustrates an example object detection mask in accordance with one or more techniques of this disclosure.

FIG. 3 illustrates an object detection mask 300 in accordance with one or more techniques of this disclosure. As shown in FIG. 3, object detection mask 300 is an object or color mask of an image, e.g., an image of two people smiling. For example, object detection mask 300 can be a memory color mask. Object detection mask 300 can identify the skin of the two people in the image via the black lines or crosshatch portions of the mask. These detected portions of the mask can also be identified via other colors or patterns. As shown in FIG. 3, in some instances, the non-detected portions of the image can be displayed in mask 300 as a solid white color. These non-detected portions of the mask can also be identified via other colors or patterns.

As shown in FIG. 3, object or color detection masks herein can identify or detect a certain desired object or color. These object or color detection masks can also help to plot or map a probability distribution for each pixel. This can help to determine whether a certain pixel is the desired color or object. For example, a certain pixel in an object or color detection mask can be mapped based on a certain color space, e.g., an HSV, RGB, or YUV color space. Based on the object or color mapping, the present disclosure can adjust the object or color identification system in order to identify certain color space values. For instance, the object or color identification system can include a range of color space values. In an HSV color space, when a hue, saturation, or value falls within this range, the pixel may be identified or detected as a desired object or color.

In some aspects, the object or color identification system can include histograms, e.g., histograms of color space values. So the present disclosure can identify certain objects or colors based on histograms of the object or color identification system. In some instances, for each image or frame, the present disclosure can utilize a unique object or color identification system. By doing so, the present disclosure can utilize unique histograms of color space values for each image or frame. Once a desired object or color is identified, the present disclosure can modify or enhance, e.g., smoothen, sharpen, or de-noise, the object or color.

FIGS. 4A, 4B, and 4C illustrate example hue (H), saturation (S), and value (V) (HSV) distribution graphs 400, 410, and 420, respectively. More specifically, FIGS. 4A-4C are statistical analyses of the image that produced object detection mask 300 in FIG. 3. As shown in FIG. 4A, graph 400 includes the hue (H) distribution of the image that produced mask 300. Graph 400 includes a skin plot, a non-skin plot, and a skin detection range. The skin detection range is the area on the image where skin is likely located based on the image analysis. As shown in FIG. 4B, graph 410 includes the saturation (S) distribution of the image that produced mask 300. Graph 410 also includes a skin plot, a non-skin plot, and a skin detection range. As shown in FIG. 4C, graph 420 includes the value (V) distribution of the image that produced mask 300. Graph 420 also includes a skin plot, a non-skin plot, and a skin detection range. Based on the HSV distribution graphs 400, 410, and 420 in FIGS. 4A, 4B, and 4C, object detection mask 300 can be produced.

Additionally, the present disclosure can detect a change of scenery via the images or frames in a scene. For example, the present disclosure can detect or identify a new scene for a series of images or frames, as well as an entirely new image or frame. After this, the present disclosure can adjust the object or color identification system for this new scene or image. Also, the present disclosure can create a new object or color mask based on this adjusted object or color identification system. Therefore, the present disclosure can include an adjustable object or color identification system based on a new scene or image.

FIGS. 5A and 5B illustrate processes 500 and 550, respectively, in accordance with one or more techniques of this disclosure. As shown in FIG. 5A, process 500 can include a number of steps for adaptive object classification. At 502, the process can detect a change in a plurality of images in a scene. At 504, the process can identify an image of the plurality of images. At 506, the process can downscale or down-sample the image. Additionally, at 508, the process can perform AI based pixel classification on the downscaled or down-sampled image.

At 510, the process can compute statistics on each pixel classification. At 512, the process can extract one or more pixel features that are associated with the AI based pixel classifications. In some aspects, this can serve as a low power proxy for the AI. At 514, the process can compute one or more parameters for each of the pixel features. At 516, the process can translate the one or more parameters to a set of registers in a pixel processing pipeline. At 518, the process can reconfigure hardware in a pixel processing pipeline, e.g., low power hardware, to use an updated configuration.

As shown in FIG. 5B, process 550 can also include a number of steps for adaptive object classification. At 552, the process can receive at least one pixel in a color space, e.g., an HSV, RGB, or YUV color space. At 554, the process can apply logic in hardware to determine a membership level of one or more pixel classifications, e.g., skin, sky, or foliage classifications. At 556, the process can adjust one or more image post-processing controls as a function of the pixel classifications. For example, process 550 can reduce the sharpening of high membership levels of certain pixel classifications, e.g., skin or sky classifications. Also, the process can increase the color saturation for high membership levels of certain pixel classifications, e.g., skin or sky classifications. As shown in FIG. 5B, process 550 can be a low power process operating on individual pixels at real-time display rates. Further, the logic of process 550 can receive its configuration from process 500.

As shown in FIGS. 5A and 5B, some aspects of the present disclosure can utilize multiple processes simultaneously. For instance, process 500 and process 550 may occur in parallel. Process 500 can continuously monitor the pixels going through the pipeline, e.g., by utilizing detector settings. Process 550 can be performed in parallel to process 500 and identify any scene changes. Process 550 can also utilize masks or histograms to identify the scene changes. When there is a new or updated scene, process 550 can instruct process 500 to utilize an updated configuration to monitor the pixels in the images.

As mentioned above, aspects of the present disclosure can use AI methods to generate an object or color mask, e.g., a memory color mask or a skin color mask. This object or color mask can be utilized on a low resolution image, such as a downscaled or down-sampled image. Additionally, object or color masks may not need to be generated for every frame, e.g., in order to save power. Moreover, aspects of the present disclosure can use mask information to adapt the configuration of a memory color detector to match the scene content. Aspects of the present disclosure can also analyze the distributions of objects or non-objects. For example, the present disclosure can identify memory color content or non-memory color content, e.g., skin or non-skin, in a chosen color space, such as an HSV, RGB, or YUV color space.

As indicated above, the present disclosure can determine a threshold for desired objects or colors. For instance, the threshold can be identified in terms of histogram distributions. By determining a histogram distribution threshold, the present disclosure can maximize the likelihood that a desired object or color is identified. In some instances, the histogram distribution threshold can be based on the configuration of a memory color detector. Also, the hardware in an image processing pipeline can determine certain ranges for certain object or color detection.

Additionally, the histogram distribution threshold can be based on trapezoidal regions, such that the threshold identification may not be a binary identification, but rather a soft or adaptive identification. For example, a binary identification can provide a definite affirmative or negative decision. In contrast, a soft decision can identify or provide a confidence level of the selected threshold outcome. So in a soft decision, the determination of an object or color identification can include a percentage of the confidence level, e.g., 80% confidence, regarding whether a certain pixel is a desired object or color. For example, a pixel may return a confidence level, e.g., an 80% confidence level, that the pixel is a skin tone. Moreover, if the pixel is in a shadow, it may represent a lower level of confidence, e.g., a 60% confidence.

Also, if object or color information for a pixel falls within a rectangular portion of a trapezoidal region in a histogram, there may be a high confidence level that the pixel is a certain color. However, if the object or color information for a pixel falls within one of two triangular portions of the trapezoidal region on a histogram, e.g., outside the rectangular portion, there may be a decreasing level of confidence that the pixel is a certain color. For instance, as the object or color information falls further away from the rectangular portion on a histogram, the level of confidence can decrease.

Aspects of the present disclosure can also convert a three dimensional (3D) color space, e.g., a RGB, YUV, or HSV color space, of an image to a two dimensional (2D) spatial recognition of the pixels in the image. So a spatial analysis or spatial recognition can be performed on an image or scene. This spatial analysis can then be converted back to the 3D color space of the scene in order to apply the findings of the spatial recognition to the 3D color space. As such, aspects of the present disclosure can utilize an image analysis or AI analysis on a pixel processing domain.

Some aspects of the present disclosure may not need an AI processor to perform a pixel analysis. For instance, the present disclosure can downscale an image in order to reduce the amount of pixels, and perform a histogram analysis on the downscaled image. For example, a 4000× 2000 pixel image can be downscaled or down-sampled to a 400×200 pixel image. By doing so, the present disclosure can maintain a low power consumption during the image processing. As such, aspects of the present disclosure can utilize a low power solution in order to determine the object or color identification of pixels in an image or frame. This object or color identification may be performed when there is a scene change, such that the object or color identification may not be performed continuously. Also, the object or color identification or AI processing unit can instruct certain processing hardware to identify whether a pixel is within a certain color range. The hardware can also perform this function with a reduced power consumption.

As indicated above, the AI processing unit can determine or identify which pixel ranges or values are of interest for a certain object or color identification. For example, each time there is a scene change, the AI can reconfigure an object or color analyzer, as well as the hardware. Accordingly, aspects of the present disclosure can utilize AI to determine a pixel range or value for an object or color identification, and then a color analyzer or processing hardware can perform the object or color identification. By utilizing the AI to determine the pixel range or value, and not perform the actual color or object identification, aspects of the present disclosure can reduce the amount of power consumed. So aspects of the present disclosure may not determine or analyze the pixel range or value for a certain object or color for each frame in a scene or video. For example, a pixel determination or analysis may be performed for images or frames in new or updated scenes. As such, any processing performed by the AI, e.g., an AI processor or AI processing unit, may not be performed for each scene.

Aspects of the present disclosure may also include a number of different object or color detectors that can be utilized for a number of images in a scene or video. And once a desired object or color is identified or detected, this desired object or color can be enhanced or adjusted. Some examples of objects or colors that can be identified or detected can be memory colors, e.g., skin, sky, or foliage. Also, the object or color to be identified can include an object classification, a color classification, a pixel classification, an object content, a color content, or a pixel content.

Additionally, aspects of the present disclosure can perform a pixel based segmentation of an image or frame in a scene. So the present disclosure can identify or detect which pixels are included in a certain object or color classification. In some instances, image processing hardware can analyze a certain pixel in an image of a scene. By using AI to analyze an entire scene, this can increase the likelihood that the hardware pixel analysis is accurate. So aspects of the present disclosure may improve the performance of a pixel based classifier by utilizing spatial information and distribution. Also, the present disclosure can utilize a reduced power pixel classification or image segmentation.

As indicated herein, an AI analysis can include an object or color classification. Based on this AI analysis, the present disclosure can adaptively determine certain pixel classification criteria. In some aspects, the present disclosure can utilize a high complexity object or color classification, e.g., via AI methods, but also minimize the processing of the object or color classification in order to reduce power. As such, low complexity pixel processing at image processing hardware can be utilized on a per-pixel basis. By doing so, aspects of the present disclosure can reduce the amount of power utilized.

In some aspects, a software algorithm can determine optimal decision boundaries, e.g., trapezoidal boundaries along color space axes, within a chosen color space in order to maximize the probability of object or color detection and/or minimize the probability of erroneous identifications. Temporal filtering can also be applied to the object region boundaries, e.g., to smoothly change images within a certain scene and/or quickly change at scene transitions. Additionally, aspects of the present disclosure can select trapezoidal boundaries based on color space distributions of masked or non-masked pixels. As mentioned above, the present disclosure can also utilize a detector performance as a function of a histogram threshold.

Figure 6:
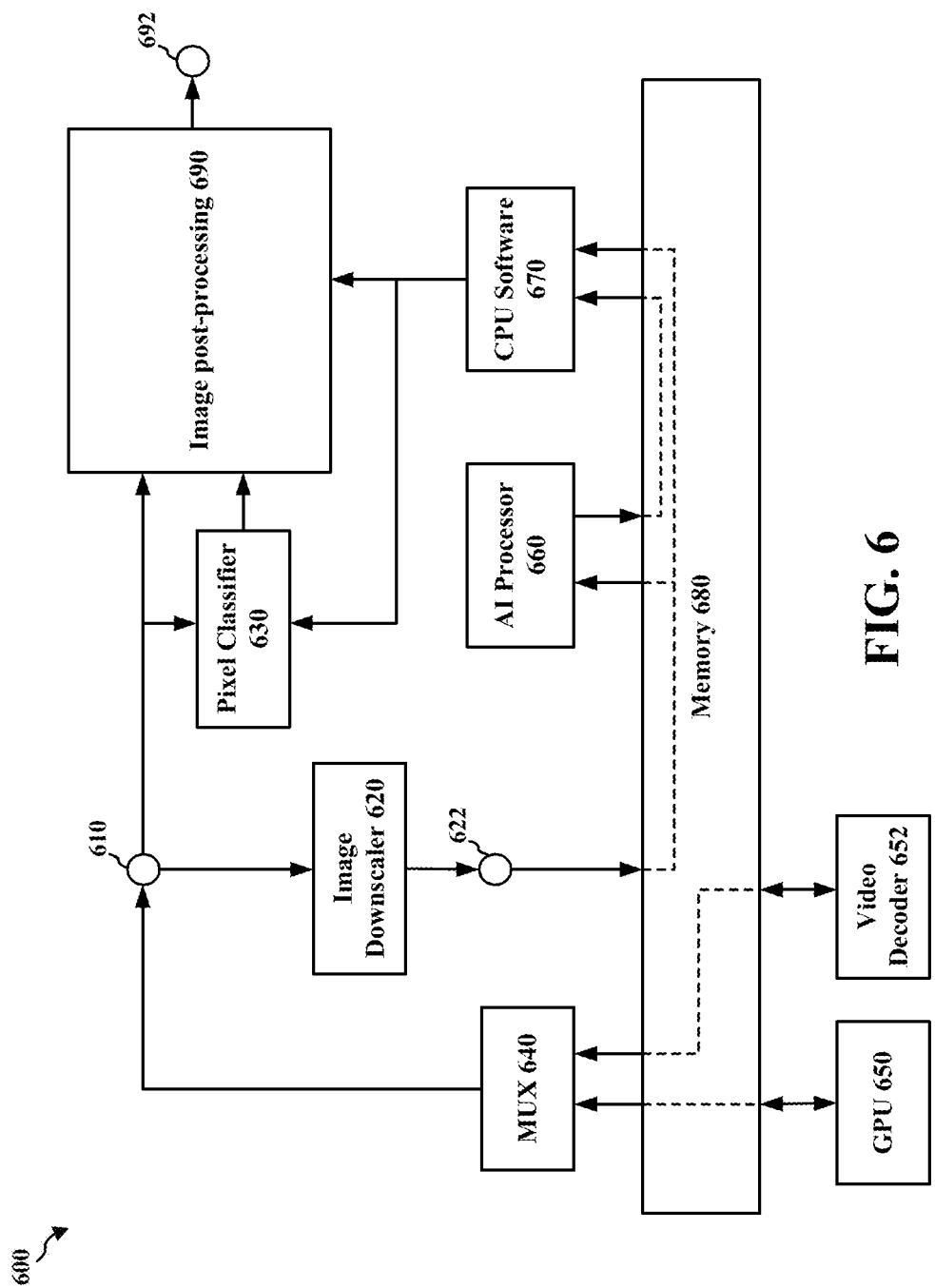
FIG. 6 illustrates an example diagram in accordance with one or more techniques of this disclosure.

FIG. 6 illustrates a diagram 600 in accordance with one or more techniques of this disclosure. As shown in FIG. 6, diagram 600 can include input 610, image downscaler 620, frame selection step 622, pixel classifier 630, and multiplexer (MUX) 640. Diagram 600 can also include a content source, which can include a GPU 650 and a video decoder 652. Additionally, diagram 600 can include AI processor or AI processing unit 660, CPU software 670, memory 680, image post-processing unit 690, and output 692. The input 610 of diagram 600 can include an image or image sequence. Also, the output 692 of diagram 600 can include the image or image sequence after processing.

As shown in FIG. 6, input 610 can communicate with image downscaler 620, pixel classifier 630, and image post-processing unit 690. Also, image downscaler 620 can communicate with frame selection step 622, e.g., to select a frame or image. Further, frame selection step 622 can communicate, e.g., a reduced resolution image, with AI processor 660 and/or CPU software 670, e.g., via memory 680. AI processor 660 can also communicate, e.g., detection masks, with CPU software 670 via memory 680. GPU 650 and video decoder 652 can communicate with MUX 640, e.g., via memory 680. MUX 640 can also communicate with input 610. Also, CPU software 670 can communicate with pixel classifier 630, e.g., a configuration update, and/or image post-processing unit 690. Pixel classifier 630 can also communicate with image post-processing unit 690. After this, image post-processing unit 690 can communicate with the output 692, e.g., an image or image sequence.

As further indicate in FIG. 6, the image post-processing unit 690 can be pre-frame composition or post-frame composition. In some aspects, diagram 600 can include a low power real-time pixel processing pipeline, which can include input 610, image downscaler 620, pixel classifier 630, and/or image post-processing unit 690. Also, diagram 600 can include non-real-time processing, which can be performed on selected images or frames. This non-real-time processing can include frame selection step 622, MUX 640, GPU 650, video decoder 652, AI processor 660, CPU software 670, and memory 680. In some aspects, AI processor 660 can be referred to as a neural network processor. Also, the CPU software 670 can be utilized for a statistical analysis of certain masks.

FIG. 6 illustrates examples of the aforementioned adaptive object or color classification processes for increasing object or color detection accuracy and/or reducing the amount of power consumed. As shown in FIG. 6, aspects of the present disclosure, e.g., processing units, image processing units, video processing units, and/or DPUs herein, can perform a number of different steps or processes to perform the adaptive object or color classification. Although processing units, image processing units, video processing units, and DPUs can perform the adaptive object or color classification mentioned herein, a number of other components can also perform these steps.

As indicated above, processing units herein, e.g., image processing units, video processing units, and/or DPUs, can downscale or down-sample, e.g., via image downscaler 620, a first image of a plurality of images in a scene, e.g., image sequence at input 610. Processing units herein can also generate object mask information, e.g., via AI processor 660, for one or more objects in a first image of a plurality of images in a scene, e.g., image sequence at input 610. In some aspects, the first image, e.g., image at input 610, can be at least one of a downscaled image, a down-sampled image, or a low resolution image, e.g., via image downscaler 620.

Processing units herein can also determine one or more object classifications, e.g., via pixel classifier 630, of the first image based on the generated object mask information, e.g., via AI processor 660. Additionally, processing units herein can map the one or more object classifications of the first image to a histogram, e.g., via AI processor or CPU software 670. In some instances, the one or more object classifications may include one or more trapezoidal regions.

Processing units herein can also identify at least one of a first object classification or one or more second object classifications of the first image based on the determined one or more object classifications, e.g., via pixel classifier 630. In some aspects, the first object classification, e.g., via pixel classifier 630, may include memory color content and the one or more second object classifications, e.g., via pixel classifier 630, may include non-memory color content. Processing units herein can also modify at least one of the first object classification or the one or more second object classifications of the first image, e.g., via image post-processing unit 690. In some instances, at least one of the first object classification or the one or more second object classifications may be sharpened, smoothened, de-noised, or enhanced, e.g., via image post-processing unit 690.

Further, processing units herein can identify a modification to at least one of the one or more object classifications based on a second image of the plurality of images in the scene, e.g., via AI processor 660. Processing units herein can also adjust or maintain the one or more object classifications, e.g., via AI processor 660, based on the identified modification to at least one of the one or more object classifications. In some aspects, the one or more object classifications may be adjusted or maintained, e.g., via AI processor 660, based on one or more trapezoidal regions of the one or more object classifications.

Processing units herein can also adjust or maintain the object mask information, e.g., via AI processor 660, based on the identified modification to at least one of the one or more object classifications. Moreover, the one or more object classifications may be determined via an object detector or a color detector, e.g., via AI processor 660. Processing units herein can also configure an object detector or a color detector based on the identified modification to at least one of the one or more object classifications, e.g., via AI processor 660.

In some aspects, the one or more object classifications may include at least one of a color classification, a memory color classification, a pixel classification, object content, color content, memory color content, or pixel content, e.g., via pixel classifier 630. Also, the object mask information may include memory color mask information, e.g., via AI processor 660. Further, each of the one or more object classifications may include a plurality of pixels, e.g., via pixel classifier 630.

Figure 7:
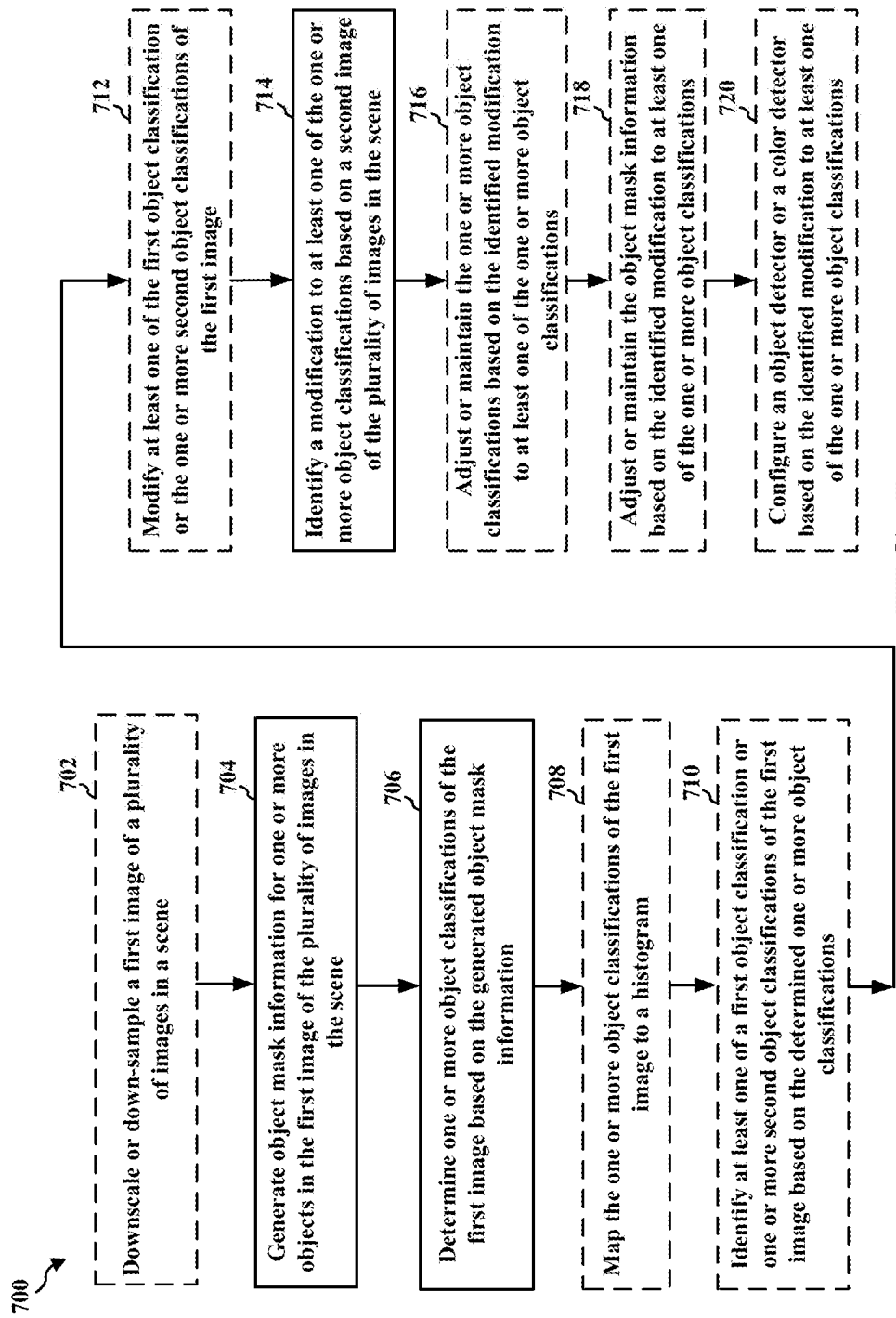
FIG. 7 illustrates an example flowchart of an example method in accordance with one or more techniques of this disclosure.

FIG. 7 illustrates flowchart 700 of an example method in accordance with one or more techniques of this disclosure. The method may be performed by an apparatus such as an image processing unit, a video processing unit, a display processing unit (DPU), a display engine, a GPU, a CPU, or some other processor for image or video processing. At 702, the apparatus can downscale or down-sample a first image of a plurality of images in a scene, as described in connection with the examples in FIGS. 3, 4A, 4B, 4C, 5A, 5B, and 6.

At 704, the apparatus can generate object mask information for one or more objects in a first image of a plurality of images in a scene, as described in connection with the examples in FIGS. 3, 4A, 4B, 4C, 5A, 5B, and 6. In some aspects, the first image can be at least one of a downscaled image, a down-sampled image, or a low resolution image, as described in connection with the examples in FIGS. 3, 4A, 4B, 4C, 5A, 5B, and 6.

At 706, the apparatus can determine one or more object classifications of the first image based on the generated object mask information, as described in connection with the examples in FIGS. 3, 4A, 4B, 4C, 5A, 5B, and 6. At 708, the apparatus can map the one or more object classifications of the first image to a histogram, as described in connection with the examples in FIGS. 3, 4A, 4B, 4C, 5A, 5B, and 6. In some instances, the one or more object classifications may include one or more trapezoidal regions, as described in connection with the examples in FIGS. 3, 4A, 4B, 4C, 5A, 5B, and 6.

At 710, the apparatus can identify at least one of a first object classification or one or more second object classifications of the first image based on the determined one or more object classifications, as described in connection with the examples in FIGS. 3, 4A, 4B, 4C, 5A, 5B, and 6. In some aspects, the first object classification may include memory color content and the one or more second object classifications may include non-memory color content, as described in connection with the examples in FIGS. 3, 4A, 4B, 4C, 5A, 5B, and 6.

At 712, the apparatus can also modify at least one of the first object classification or the one or more second object classifications of the first image, as described in connection with the examples in FIGS. 3, 4A, 4B, 4C, 5A, 5B, and 6. In some instances, at least one of the first object classification or the one or more second object classifications may be sharpened, smoothened, de-noised, or enhanced, as described in connection with the examples in FIGS. 3, 4A, 4B, 4C, 5A, 5B, and 6.

At 714, the apparatus can identify a modification to at least one of the one or more object classifications based on a second image of the plurality of images in the scene, as described in connection with the examples in FIGS. 3, 4A, 4B, 4C, 5A, 5B, and 6. At 716, the apparatus can adjust or maintain the one or more object classifications based on the identified modification to at least one of the one or more object classifications, as described in connection with the examples in FIGS. 3, 4A, 4B, 4C, 5A, 5B, and 6. In some aspects, the one or more object classifications may be adjusted or maintained based on one or more trapezoidal regions of the one or more object classifications, as described in connection with the examples in FIGS. 3, 4A, 4B, 4C, 5A, 5B, and 6.

At 718, the apparatus can adjust or maintain the object mask information based on the identified modification to at least one of the one or more object classifications, as described in connection with the examples in FIGS. 3, 4A, 4B, 4C, 5A, 5B, and 6. Moreover, the one or more object classifications may be determined via an object detector or a color detector, as described in connection with the examples in FIGS. 3, 4A, 4B, 4C, 5A, 5B, and 6. At 720, the apparatus can configure an object detector or a color detector based on the identified modification to at least one of the one or more object classifications, as described in connection with the examples in FIGS. 3, 4A, 4B, 4C, 5A, 5B, and 6.

In some aspects, the one or more object classifications may include at least one of a color classification, a memory color classification, a pixel classification, object content, color content, memory color content, or pixel content, as described in connection with the examples in FIGS. 3, 4A, 4B, 4C, 5A, 5B, and 6. Also, the object mask information may include memory color mask information, as described in connection with the examples in FIGS. 3, 4A, 4B, 4C, 5A, 5B, and 6. Further, each of the one or more object classifications may include a plurality of pixels, as described in connection with the examples in FIGS. 3, 4A, 4B, 4C, 5A, 5B, and 6.

In one configuration, a method or apparatus for display or graphics processing is provided. The apparatus may be an image processing unit, a video processing unit, a DPU, a display engine, a GPU, a CPU, or some other processor that can perform image or video processing. In one aspect, the apparatus may be the processing unit 120 within the device 104, or may be some other hardware within device 104 or another device. The apparatus may include means for generating object mask information for one or more objects in a first image of a plurality of images in a scene. The apparatus may also include means for determining one or more object classifications of the first image based on the generated object mask information. The apparatus may also include means for identifying a modification to at least one of the one or more object classifications based on a second image of the plurality of images in the scene. The apparatus may also include means for adjusting or maintaining the one or more object classifications based on the identified modification to at least one of the one or more object classifications. The apparatus may also include means for adjusting or maintaining the object mask information based on the identified modification to at least one of the one or more object classifications. The apparatus may also include means for identifying at least one of a first object classification or one or more second object classifications of the first image based on the determined one or more object classifications. The apparatus may also include means for modifying at least one of the first object classification or the one or more second object classifications of the first image. The apparatus may also include means for mapping the one or more object classifications of the first image to a histogram, wherein the one or more object classifications may include one or more trapezoidal regions. The apparatus may also include means for configuring the object detector or the color detector based on the identified modification to at least one of the one or more object classifications. The apparatus may also include means for downscaling or down-sampling the first image in the scene.

The subject matter described herein can be implemented to realize one or more benefits or advantages. For instance, the described image or video processing techniques can be used by image processing units, video processing units, DPUs, display engines, GPUs, or CPUs to increase object or color detection accuracy and/or reduce the amount of power consumed. This can also be accomplished at a low cost compared to other image or video processing techniques. Moreover, the image or video processing techniques herein can improve or speed up processing or execution time. Further, the image or video processing techniques herein can improve the resource or data utilization and/or resource efficiency. Additionally, aspects of the present disclosure can utilize adaptive object or color classification processes in order to increase the object or color detection accuracy and/or reduce the amount of power consumed.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, comprising:
generating object mask information for one or more objects in a first image of a plurality of images in a scene, wherein the first image is at least one of a downscaled image, a down-sampled image, or a low resolution image;
determining one or more object classifications of the first image based on the generated object mask information; and
identifying a modification to at least one of the one or more object classifications based on a second image of the plurality of images in the scene.

2. The method of claim 1, further comprising:
adjusting or maintaining the one or more object classifications based on the identified modification to at least one of the one or more object classifications.

3. The method of claim 2, wherein the one or more object classifications are adjusted or maintained based on one or more trapezoidal regions of the one or more object classifications.

4. The method of claim 1, further comprising:
adjusting or maintaining the object mask information based on the identified modification to at least one of the one or more object classifications.

5. The method of claim 1, further comprising:
identifying at least one of a first object classification or one or more second object classifications of the first image based on the determined one or more object classifications.

6. The method of claim 5, wherein the first object classification includes memory color content and the one or more second object classifications include non-memory color content.

7. The method of claim 5, further comprising:
modifying at least one of the first object classification or the one or more second object classifications of the first image.

8. The method of claim 7, wherein at least one of the first object classification or the one or more second object classifications is sharpened, smoothened, de-noised, or enhanced.

9. The method of claim 1, further comprising:
mapping the one or more object classifications of the first image to a histogram, wherein the one or more object classifications include one or more trapezoidal regions.

10. The method of claim 1, wherein the one or more object classifications are determined via an object detector or a color detector.

11. The method of claim 10, further comprising:
configuring the object detector or the color detector based on the identified modification to at least one of the one or more object classifications.

12. The method of claim 1, further comprising:
downscaling or down-sampling the first image in the scene.

13. The method of claim 1, wherein the one or more object classifications include at least one of a color classification, a memory color classification, a pixel classification, object content, color content, memory color content, or pixel content.

14. The method of claim 1, wherein the object mask information includes memory color mask information.

15. The method of claim 1, wherein each of the one or more object classifications includes a plurality of pixels.

16. An apparatus for image processing, comprising:
a memory; and
at least one processor coupled to the memory and configured to:
generate object mask information for one or more objects in a first image of a plurality of images in a scene, wherein the first image is at least one of a downscaled image, a down-sampled image, or a low resolution image;
determine one or more object classifications of the first image based on the generated object mask information; and
identify a modification to at least one of the one or more object classifications based on a second image of the plurality of images in the scene.

17. The apparatus of claim 16, wherein the at least one processor is further configured to: adjust or maintain the one or more object classifications based on the identified modification to at least one of the one or more object classifications.

18. The apparatus of claim 17, wherein the one or more object classifications are adjusted or maintained based on one or more trapezoidal regions of the one or more object classifications.

19. The apparatus of claim 16, wherein the at least one processor is further configured to:
adjust or maintain the object mask information based on the identified modification to at least one of the one or more object classifications.

20. The apparatus of claim 16, wherein the at least one processor is further configured to:
identify at least one of a first object classification or one or more second object classifications of the first image based on the determined one or more object classifications.

21. The apparatus of claim 20, wherein the first object classification includes memory color content and the one or more second object classifications include non-memory color content.

22. The apparatus of claim 20, wherein the at least one processor is further configured to:
modify at least one of the first object classification or the one or more second object classifications of the first image.

23. The apparatus of claim 22, wherein at least one of the first object classification or the one or more second object classifications is sharpened, smoothened, de-noised, or enhanced.

24. The apparatus of claim 16, wherein the at least one processor is further configured to:
map the one or more object classifications of the first image to a histogram, wherein the one or more object classifications include one or more trapezoidal regions.

25. The apparatus of claim 16, wherein the one or more object classifications are determined via an object detector or a color detector.

26. The apparatus of claim 25, wherein the at least one processor is further configured to:
configure the object detector or the color detector based on the identified modification to at least one of the one or more object classifications.

27. The apparatus of claim 16, wherein the at least one processor is further configured to:
downscale or down-sample the first image in the scene.

28. The apparatus of claim 16, wherein the one or more object classifications include at least one of a color classification, a memory color classification, a pixel classification, object content, color content, memory color content, or pixel content.

29. An apparatus for image processing, comprising:
means for generating object mask information for one or more objects in a first image of a plurality of images in a scene, wherein the first image is at least one of a downscaled image, a down-sampled image, or a low resolution image;
means for determining one or more object classifications of the first image based on the generated object mask information; and
means for identifying a modification to at least one of the one or more object classifications based on a second image of the plurality of images in the scene.

30. A non-transitory computer-readable medium storing computer executable code for image processing, comprising code to:
generate object mask information for one or more objects in a first image of a plurality of images in a scene, wherein the first image is at least one of a downscaled image, a down-sampled image, or a low resolution image;
determine one or more object classifications of the first image based on the generated object mask information; and identify a modification to at least one of the one or more object classifications based on a second image of the plurality of images in the scene.

\* \* \* \* \*